A. A. DOTY.
EMERGENCY BRAKE.
APPLICATION FILED AUG. 5, 1913.
1,124,716.
Patented Jan. 12, 1915.
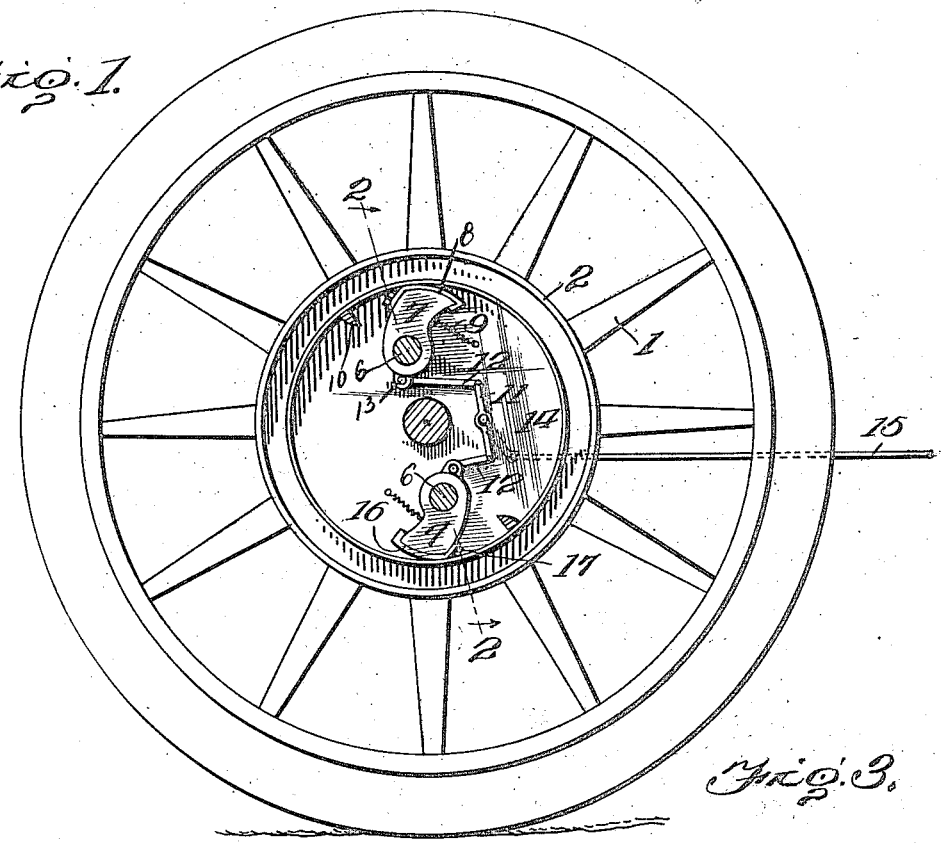
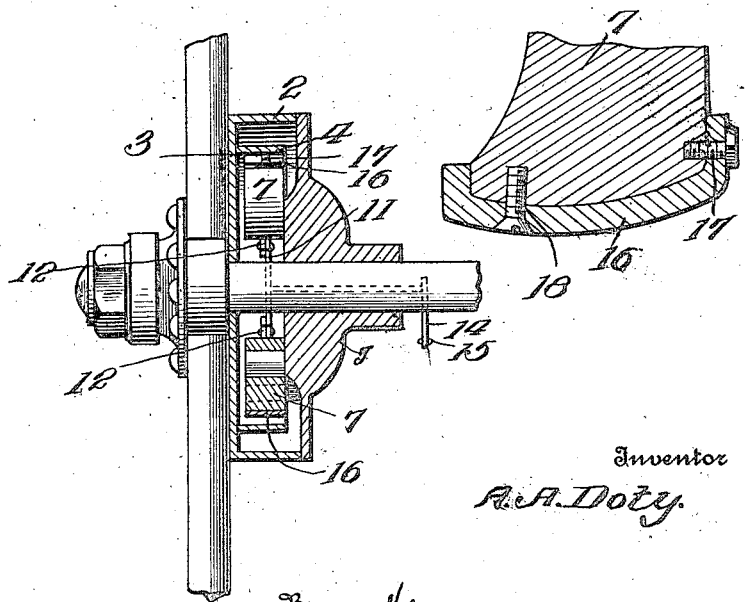
Inventor
A. A. Doty.
Witnesses
By
Attorneys

UNITED STATES PATENT OFFICE.

ALBERT A. DOTY, OF GREENWOOD, INDIANA, ASSIGNOR OF ONE-HALF TO HENCE ORME, OF GREENWOOD, INDIANA.

EMERGENCY-BRAKE.

1,124,716.      Specification of Letters Patent.     Patented Jan. 12, 1915.

Application filed August 5, 1913. Serial No. 783,162.

*To all whom it may concern:*

Be it known that I, ALBERT A. DOTY, citizen of the United States, residing at Greenwood, in the county of Johnson and State of Indiana, have invented certain new and useful Improvements in Emergency-Brakes, of which the following is a specification.

This invention relates to emergency brakes for automobiles, and has as its object to provide a brake which may be readily embodied in the construction of the ordinary band brake without material alteration thereof, and which will act effectually and automatically to lock the rear wheels of the automobile against backward rotation as, for example, when the car is ascending a deep grade and the driver finds it necessary to change from high to low speed. It frequently happens under these circumstances that the engine will stop and it is then necessary for the driver to apply the emergency brakes, leave the machine and crank the engine. If the emergency brakes for any reason fail to hold the car, it is necessary for the driver to steer the car back down the grade or into an obstruction beside the road.

The invention therefore aims to provide a brake which will automatically positively lock the rear wheels against backward rotation, as soon as they start to so rotate, thereby allowing the machine to stand still while the gearing is being shifted from high to low.

Another aim of the invention is to so construct the brake that it will not in any way interfere with the ordinary band and emergency brakes and may be readily rendered inoperative when it is desired to back or turn the car.

In the accompanying drawings: Figure 1 is a side elevation of the brake embodying the present invention, the ordinary brake drum and casing being shown but the brake band and the emergency brake being omitted for the sake of clearness. Fig. 2 is a vertical transverse sectional view through the brake, on the line 2—2 of Fig. 1. Fig. 3 is a detail sectional view through the engaging end of one of the braking dogs illustrating the means provided for taking up the wear resulting from the contact of the said dogs with the braking flange.

Corresponding and like parts are referred to in the following description and indicated in all the views of the drawings by the same reference characters.

In the drawings, the numeral 1 indicates the rear wheel of an automobile to which the brake embodying the present invention is applied. The brake drum is indicated by the numeral 2 and is of the ordinary construction, it comprising the usual side plate 3, upon which and within the drum is mounted the usual expanding emergency brake, (not shown) designed to work against the inner side of the drum 2. The ordinary brake band (not shown) is to be mounted upon the drum in position to coöperate with the outer surface thereof.

The brake mechanism embodying the present invention includes as one of its elements, an annular flange 4 which is formed integral with the side plate 3 of the brake drum and projects laterally therefrom concentric to the drum 2, as clearly shown in Figs. 1 and 2 of the drawings, and the inner side of this flange is smoothly finished so as to constitute a braking surface. The other side plate of the brake drum is indicated by the numeral 5 and is provided with diametrically oppositely located pivot studs 6 it being understood that the drum is rotatable with respect to the plate 5 and that the said plate is held stationary. Mounted for rocking movement upon each of the studs 6 is a braking dog 7 having a cam braking surface 8 which is eccentric to the axis of the stud so that the heel of the dog is located nearer the axis of the stud 6 than is the toe of the dog. A spring 9 is secured at one end to each of the dogs 7 and these springs are secured at their other ends to the plate 5, and serve to lightly hold the heels of the dogs in frictional contact with the inner surface of the flange 4. The dogs are so disposed that when the wheel is rotating forwardly, the flange 4 will ride lightly over the heels of the dogs, but when the wheel is turned backwardly, the frictional faces 8 of the dogs will bind firmly against the inner side of the flange 4 and resist such movement. In order to limit the movement of the dogs upon their pivot studs in a direction to cause the faces 8 to bind against the surface of the flange the plate 5 is formed upon its inner side with inwardly projecting stop lugs 10 arranged in the path of movement of the contacting ends of the dogs. In order that the dogs may be moved to position out of contact with the flange 4, a rocking member 11 is mounted upon the inner face of the plate 5 and is connected at its ends by means of links 12 to the inner ends of the dogs 7, the dogs at their said inner ends being provided with pivot ears 13 for the purpose stated. The rocker 11 is fixed upon a relatively short shaft which extends through the plate 5 and fixed upon this shaft is an arm 14 to which is connected one end of an operating rod 15 having its other end connected to a foot or hand lever (not shown).

It will now be understood by reference to Fig. 1 of the drawings that when it is desired to back the machine or to turn the same, the rod 15 is moved forwardly so as to rock the member 11 and therefy shift the links 12 in such a manner as to move the faces 8 of the dogs out of contact with the flange 4.

From the foregoing, it will be apparent that the brake mechanism embodying the present invention does not in any way interfere with the use of the ordinary band brake and expansible emergency brake.

In order that the ends of the braking dogs may have firm engagement with the braking flange and in order that these dogs may be made of hardened steel except at their engaging ends, a shoe 16 of brass or other suitable soft metal is fitted to the end of each dog and secured in place by means of a bolt 17 fitted through one end of the shoe and threaded into one edge of the respective dog and the screw 18 which is fitted through the contacting face of the shoe and into the end of the dog, the head of the screw being countersunk so that it will not mar the braking surface of the flange should the heel end of the dog come in contact with the flange. It will be readily understood at this point that the shoes 16 may be readily removed and replaced when found necessary and that when they become worn to a slight degree a thin insert of metal may be fitted between their inner sides and the end edges of the dogs for the purpose of slightly advancing their contacting faces.

Having thus described the invention what is claimed as new is:

1. In brake mechanism of the class described, a brake drum having a braking surface, a supporting plate, a braking dog pivotally mounted upon the plate and having a cam end, a shoe having a curved body portion disposed against the said end of the dog and having end portions engaging the forward and rearward sides of the dog, a securing element fastened through one of the said ends of the shoe and into the said dog, and a second securing element threaded through the body portion of the shoe near its other end and into the end of the dog.

2. In brake mechanism of the class described, a brake drum having a braking surface, a supporting plate, spaced braking dogs pivotally mounted upon the plate at diametrically opposite points theron and provided at their outer ends with braking surfaces for coöperation with the braking surface of the drum, an arm mounted for rocking movement upon the plate and having portions extending in opposite directions from its axis, means for rocking said arm, and links pivotally connected to the said portions of the arm and to the inner ends of the said dogs.

In testimony whereof I affix my signature in presence of two witnesses.

ALBERT A. DOTY. [L. S.]

Witnesses:
JAMES T. HARDEN,
ORA L. HARDEN.